United States Patent Office 3,454,555
Patented July 8, 1969

3,454,555
OIL-SOLUBLE HALOGEN-CONTAINING POLY-
AMINES AND POLYETHYLENEIMINES
Henricus G. P. van der Voort and Willem P. de Jong,
Amsterdam, Netherlands, assignors to Shell Oil Company, New York, N.Y., a corporation of Delaware
No Drawing. Filed Dec. 6, 1965, Ser. No. 512,031
Claims priority, application Netherlands, Jan. 28, 1965,
6501044
Int. Cl. C07c 87/20; C08f 27/08; C10m 1/32
U.S. Cl. 260—239
8 Claims

ABSTRACT OF THE DISCLOSURE

Oil soluble polyalkylene polyamines or polyethyleneimines suitable as non-ash forming lube oil additives are formed by reacting chlorinated olefinic hydrocarbons with aliphatic polyamines in the presence of a hydrogen halide acceptor.

The present invention relates to a new and improved process for making novel non-ash forming oil-soluble lubricating oil additives.

In the copending applications, Ser. No. 352,650, now abandoned, and Serial No. 352,677 which issued on September 27, 1966 as U.S. Patent 3,275,554, both filed on Mar. 17, 1964, the inventions relate to lubricants containing novel ashless derivatives of polyamines which possess detergent and sludge inhibiting properties for use in engines operating at low load or under "stop and go" conditions. Although the polyamine derivatives described in the copending patent applications possess good detergent properties, they are somewhat corrosive due to the presence of hydrogen halide which is formed during the process of their formation. Efforts to remove the halides as salts has been found to be costly and not entirely successful for some remains entrained in the end product. In addition, the preparation of the detergents described in the above-mentioned copending cases requires a large amount of excess starting polyamine which renders the process economically unattractive.

It has now been found that the above objections can entirely or practically be obviated, when the reaction as described in the above referred to copending applications is effected in the presence of a hydrogen halide acceptor which is different from both the starting polyamine and that formed as the end product.

The invention therefore relates to a process for the preparation of polyamines containing compounds suitable for use as ashless lubricant additives according to which a halogen-containing hydrocarbon of high molecular weight is made to react with a polyamine with formation of hydrogen halide, in the presence of a hydrogen halide acceptor which differs from both the starting polyamine and the polyamine formed.

Examples of hydrogen halide acceptors which may be used in the process according to the invention include carbonates, bicarbonates, oxides, hydroxides, amines, in particular tertiary amines and salts of organic acids, such as salts of monocarboxylic acids, in particular the alkali metal salts and alkaline earth metal salts of organic acids.

Preference is given to carbonates, bicarbonates, oxides and hydroxides, as the use of these compounds offers the advantage, as compared with the application of other compounds suitable for this purpose, that upon reaction with hydrogen halide in addition to halide only water, and in some cases, carbon dioxide are formed.

Although, in general, carbonates, bicarbonates, oxides and hydroxides are suitable for the purpose under consideration, preference is given to the alkali metal and alkaline earth metal compounds, in particular the sodium, potassium and lithium compounds. Alkali metal (Na, K, Li) carbonates are preferred.

The hydrogen halide acceptors are preferably applied in such quantities that per gram tom of halogen present in the halogen-containing hydrocarbon from 1 to 2 gram equivalents of these substances are present in the reaction mixture.

As already observed, the invention offers the possibility of preparing polyamines by reaction of a halogen-containing hydrocarbon with a polyamine without a large excess of the starting polyamine being required.

In general, in the process according to the invention at most 2 gram molecules of the starting polyamine are used per gram of halogen present in the halogen-containing hydrocarbon. Preference is given, however, to an embodiment of the process in which per gram atom of halogen present in the halogen-containing hydrocarbon at most 1 gram molecule of the starting polyamine is used.

The reaction between the halogen-containing hydrocarbon and the polyamine is carried out at a temperature between 20 and 200° C, preferably in the presence of an inert solvent.

The halogen-containing hydrocarbons which may be used for the preparation of polyamines according to the invention may be saturated as well as unsaturated ones. They may contain aromatic or cycloaliphatic groups, either as substituents linked to a carbon chain or incorporated in the chain itself. Polyamines prepared according to the invention starting from unsaturated halogen-containing hydrocarbons may, if desired, be subjected to hydrogenation in order to transform the unsaturated compounds into saturated ones.

The process according to the invention can be applied both for the preparation of polyamines containing one polyamine group per molecule and for the preparation of polyamines containing several polyamine groups per molecule. Depending on the type of polyamine required, the starting material is either a halogen-containing hyrocarbon which contains one halogen atom per molecule or a halogen-containing hydrocarbon which contains several halogen atoms per molecule. Preference is given to halogen-containing hydrocarbons which contain from 25 to 500 carbon atoms, more specifically from 40 to 200 carbon atoms per molecule. The molecular weight of the end product ranging from about 1,200 to about 1,000,000, preferably between 2,000 and 500,000.

Examples of such halogen-containing hydrocarbons are the halogen-containing polymers and copolymers of olefins, such as chlorinated homopolymers of ethylene, propylene, butylene and isobutylene and chlorinated copolymers of ethylene and propylene in the molecular weight range of 1,200 to 500,000.

For the preparation according to the invention of polyamines containing one polyamine group per molecule the preferred starting material is a chlorine-containing hydrocarbon obtained by chlorinating an alkene with a terminal double bond of which the beta carbon atom carries a methyl group. The chlorination is preferably effected with a quantity of chlorine just sufficient to convert the alkene into the corresponding alkenyl chloride. For instance, the starting material is polyisobutlyene, which in an inert solvent is converted with just sufficient chlorine into polyisobutenyl chloride.

For the preparation according to the invention of polyamines containing several polyamine groups per molecule the preferred starting material is a chlorine-containing hydrocarbon obtained by chlorinating a copolymer of ethylene and propylene 40–60% m. of which is biult up from units originating from propylene. The chlorination is carried out in such a way that the chlorinated copolymer contains at least 2 chlorine atoms per molecule.

As examples of starting polyamines which may be used in the process according to the invention may be mentioned the polyalkylene polyamines, such as the polyethylene polyamines, the polypropylene polyamines and the polybutylene polyamines having a molecular weight of from about 300 to 5,000; the diamines, such as diaminomethane, 1,2-diaminopropane, 1,3-diaminopropane and the diaminobutanes, as well as the diamines in which one or more of the hydrogen atoms linked to nitrogen have been replaced by alkyl groups; and finally the cyclic polyamines. Preference is given to polyethylene polyamines, such as diethylene triamine and triethylene tetramine, in particular, however, to tetraethylene pentamine.

The polyamines referred to are eminently suited to application as ashless lubricant additives. They possess excellent dispersant properties and impart very good properties to lubricants in which they are contained. These lubricants may be mineral luricating oils of different viscosities, but also synthetic lubricating oils or lubricating oils containing fatty oils. The polyamines according to the invention may be added to the lubricant as such or in the form of a concentrate obtained, for instance, by mixing the polyamine with a small quantity of oil. The concentration of the polyamines referred to in the lubricants may vary within wide limits. In general, the desired detergent action is attained when the quantity added amounts of from 0.1 to 10 percent be weight, but in some cases it may be advisable to use quantities larger than those mentioned, for instance, if the lubricant is used in diesel engines apt to become badly fouled.

Upon application of the polyamines under consideration as lubricant additives they may be combined with other additives, such as antioxidants, detergent additives, viscosity index improvers, anti-corrosives, anti-foaming agents, agents to improve the lubricating effect, and other substances that are generally added to lubricants.

The invention will now be elucidated with the aid of the following examples.

Example I

Polyisobutene with a molecular weight of 1260 was dissolved in carbon tetrachloride. After addition of an iodine crystal to this solution, chlorine was passed in at room temperature until the color of the solution faded. Subsequently, the solvent was removed by evaporation. The residue contained 3.09% w. chlorine.

A mixture of 267.8 g. of the polyisobutenyl chloride prepared as described above, 60 g. toluene and 20 g. potassium carbonate powder was heated to its boiling point in a nitrogen atmosphere while being stirred, and subsequently, stirring being continued, a solution of 17.2 g. tetraethylene pentamine in 70 g. toluene was added dropwise in 4½ hours' time. Thereupon, 8 g. potassium carbonate powder was added and the reaction mixture was kept at 129° C. for 18 hours while being stirred. After cooling down the reaction product was taken up in a 60/80 boiling point gasoline and washed with water until chlorine-free. The reaction product was isolated by removing the solvent through evaporation.

A quantity of 273 g. product was obtained, with a nitrogen content of 1.67% w.

Example II

A mixture of 51.1 g. tetraethylene pentamine, 70 g. toluene and 25 g. potassium carbonate powder was heated to its boiling point in a nitrogen atmosphere while being stirred; subsequently, stirring being continued, a solution of 267 g. polysobutenyl chloride (prepared in the same way as in Example I) in 70 g. toluene was added dropwise in 6 hours' time. Thereupon 3 g. potassium carbonate powder was added and the reaction mixture was kept at 129° C. for 16 hours. The reaction product was isolated in the same way as in Example I.

A quantity of 286 g. product was obtained, with a nitrogen content of 3.12% w.

Example III

A mixture of 65.2 g. N,N-dimethyl-1,3-diaminopropane, 35 g. toluene and 25 g. potassium carbonate powder was heated to its boiling point in a nitrogen atmosphere while being stirred and subsequently, stirring being continued, 268 g. polyisobutenyl chloride (prepared in the same way as in Example I) was added in 7 hours' time. After that 25 g. toluene and 5 g. potassium carbonate powder were added and the mixture was kept at 120° C. for 16 hours. The reaction product was isolated in the same way as in Example I.

A quantity of 277 g. product was obtained, with a nitrogen content of 1.52% w.

Example IV

A mixture of 51 g. polyethyleneimine (average molecular weight 8700), 51 g. water and 100 g. n-butanol was heated to 70° C. after which 8 g. potassium carbonate powder and 25 g. toluene were added. To this mixture a mixture of 301 g. polyisobutenyl chloride (prepared in the same way as in Example I) and 25 g. potassium carbonate powder was added in 2 hours' time with stirring.

The water present was distilled off and the reaction mixture was kept at 125° C. for 20 hours. The reaction product was isolated in the same way as in Example I.

A quantity of 343 g. product was obtained, with a nitrogen content of 5.1% w.

Example V

A copolymer of ethylene and propylene containing 50% M. units originating from propylene and having a molecular weight of 250,000, was dissolved in carbon tetrachloride. This solution was stirred into a solution chlorine in carbon tetrachloride at 50° C. After stirring for some time at 50° C., the solvent was removed by evaporation. The residue contained 3.26% w. chlorine.

A solution of 10.38 g. tetraethylene pentamine in 80 g. xylene was heated to 135°C and subsequently a mixture of 52.4 g. of the ethylene-propylene copolymer chlorinated as described above, 200 g. xylene and 5.6 g. potassium carbonate powder was stirred in 3½ hours' time. Thereupon the reaction mixture was kept at 135° C. for 16 hours with stirring. After washing with water until chlorine-free a mineral oil was added to the solution of the product and the solvent was removed.

A concentrate of about 45 g. of the product in mineral oil was obtained. The nitrogen content of the product was 0.7% w.

The polyamines prepared according to Examples I, II and IV were tested as lubricant additives in a Fiat gasoline engine. The concentration of the additives in the finished lubricating oil was 1.5% w. The base oil was a solvent-refined lubricating oil distillate with a viscosity of 7.2 cs. at 98.9° C.

Fiat engine.—Water-cooled four-cylinder four-stroke gasoline engine, bore 77 mm., stroke 79.5 mm., piston displacement 1481 cm.³, compression ratio 8.8:1, power output 34.2 HP at 3600 r.p.m. The duration of the test was 35 hours. The fuel was a commercial premium gasoline containing TEL. The temperature of the cylinder cooling water was 90° C.

In these tests the degree of piston fouling was rated. The results of the engine tests are recorded in the table below, which also includes the result obtained with the base oil without additive.

| Oil used: | Piston cleanliness (10=clean) |
|---|---|
| Base oil+1.5% w. additive made by process of Example I | 7.0 |
| Base oil+1.5% w. additive made by process of Example II | 6.6 |
| Base oil+1.5% w. additive made by process of Example IV | 6.6 |
| Base oil without additive | 5.3 |

We claim as our invention:

1. A process for preparing an oil-soluble non-ash forming oil-additive obtained by reacting a chlorinated olefinic hydrocarbon having from 25 to 500 carbon atoms per chlorine atom, with an aliphatic polyamine or polyethyleneimine in the presence of a hydrogen halide acceptor selected from the group consisting of alkali metal carbonate, bicarbonate, oxide and hydroxide, at between 20 and 200°C. in an inert solvent, until the formation of hydrogen halide ceases, after which the reaction product is cooled, dissolved in a hydrocarbon liquid, water washed until halide free, and the solvent is then removed by evaporation.

2. The process of claim 1 wherein the aliphatic amine is a polyalkylene polyamine and the chlorinated olefinic hydrocarbon has from 40 to 200 carbon atoms per chlorine atom in the molecule.

3. A process for preparing an oil-soluble non-ash forming oil-additive obtained by reacting a chlorinated polyisobutylene having about one chlorine atom per 40 to 200 carbon atoms, with tetraethylene pentamine at between 20°C. and 200°C. in an inert hydrocarbon solvent and in the presence of potassium carbonate after which the reaction product is water washed and the solvent removed by evaporation.

4. A process for preparing an oil-soluble non-ash forming oil-additive obtained by reacting a chlorinated copolymer of ethylene and propylene having about one chlorine atom per 40 to 200 carbon atoms with tetraethylene pentamine at between 20°C. and 200°C. in an inert hydrocarbon solvent and in the presence of potassium carbonate after which the reaction product is water washed and the solvent removed by evaporation.

5. A process for preparing an oil-soluble non-ash forming oil-additive obtained by reacting a chlorinated polyisobutylene having about one chlorine atom per 40 to 200 carbon atoms with N,N-dimethyl-1,3-diamino-propane at between 20° C. and 200° C. in an inert hydrocarbon solvent and in the presence of potassium carbonate after which the reaction product is water washed and the solvent removed by evaporation.

6. A process for preparing an oil-soluble non-ash forming oil-additive obtained by reacting a chlorinated copolymer of ethylene and propylene having about one chlorine atom per 40 to 200 carbon atoms with N,N-dimethyl-1,3-diaminopropane at between 20° C. and 200° C. in an inert hydrocarbon solvent and the presence of potassium carbonate after which the reaction product is water washed and the solvent removed by evaporation.

7. A process for preparing an oil-soluble non-ash forming oil-additive obtained by reacting a chlorinated polyisobutylene having about one chlorine atom per 40 to 200 carbon atoms with polyethyleneimine having an average molecular weight of about 8700 at between 20°C. and 200°C. in an inert hydrocarbon solvent and in the presence of potassium carbonate after which the reaction product is water washed and the solvent removed by evaporation.

8. A process for preparing an oil-soluble non-ash forming oil-additive obtained by reacting a chlorinated copolymer of ethylene and propylene having about one chlorine atom per 40 to 200 carbon atoms with polyethyeneimine having an average molecular weight of about 8700 at between 20°C. and 200°C. in an inert hydrocarbon solvent and in the presence of potasium carbonate after which the reaction product is water washed and the solvent removed by evaporation.

References Cited

UNITED STATES PATENTS

| 2,279,294 | 4/1942 | Hardman | 260—583 |
| 2,769,841 | 11/1956 | Dylewski et al. | 260—583 |
| 3,275,554 | 9/1966 | Wagenaar | 260—583 |

CHARLES B. PARKER, *Primary Examiner.*

PATRICIA C. IVES, *Assistant Examiner.*

U.S. Cl. X.R.

44—72; 106—316; 208—289; 252—50, 77, 390; 260—583, 999